US006554037B2

(12) United States Patent
Bataille et al.

(10) Patent No.: US 6,554,037 B2
(45) Date of Patent: Apr. 29, 2003

(54) TIRE, THE SIDEWALLS OF WHICH CONTAIN A VARNISHED FILM

(75) Inventors: Francois Bataille, St-Amant-Tallende (FR); Claude Ringot, Riom (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/801,520

(22) Filed: Mar. 8, 2001

(65) Prior Publication Data

US 2001/0051677 A1 Dec. 13, 2001

Related U.S. Application Data

(63) Continuation of application No. PCT/EP00/06621, filed on Jul. 12, 2000.

(30) Foreign Application Priority Data

Jul. 12, 1999 (FR) .............................. 99 09140

(51) Int. Cl.$^7$ ................................ B60C 5/00
(52) U.S. Cl. ................ 152/525; 524/156; 524/157; 524/366; 524/376
(58) Field of Search .................. 524/366, 376, 524/156, 157; 152/525

(56) References Cited

U.S. PATENT DOCUMENTS

| | | |
|---|---|---|
| 3,882,062 A | 5/1975 | Aron |
| 4,438,058 A | 3/1984 | Tanaka |
| 5,500,219 A | 3/1996 | Utz et al. |
| 5,714,533 A | 2/1998 | Hatakeyama et al. |
| 5,824,723 A | 10/1998 | Yano et al. |

FOREIGN PATENT DOCUMENTS

| | | |
|---|---|---|
| EP | 659826 | 6/1995 |
| EP | 0733673 | 9/1996 |
| EP | 0869145 | 10/1998 |
| WO | 9215747 | 9/1992 |

OTHER PUBLICATIONS

Moreland et al, US Ser. No. 09/707575, Patent Application Filed Nov. 7, 2000.

*Primary Examiner*—Jeffrey Mullis
(74) *Attorney, Agent, or Firm*—Baker Botts L.L.P.

(57) ABSTRACT

The present invention relates to a tire the sidewalls of which comprise a vulcanized elastomeric composition, and a process for forming an even, varnished film on at least one of said sidewalls. According to the invention, the composition comprises in combination:

a polymer containing an oxy radical of the formula —O— therein, the polymer having an alkyl group on one side of the oxy radical and, on the other side of the oxy radical, at least one alkene polyoxide block of the formula $(C_nH_{2n}O)_z$ joined to a hydrogen atom at the chain end thereof, such that the hydrogen atom and the end terminal oxygen of the alkene polyoxide block form an alcohol function, in the amount of between 0.3 and 5 phr (parts by weight per 100 parts elastomer), and an alkali metal salt of an alkylsulphonic or alkylsulphuric acid, in an amount of between 0.5 and 10 phr.

The invention also provides process for forming an even, varnished film on sidewalls composed of the composition which involves exposing the sidewalls to an ozone environment of at least 20 parts per 100 million in a chamber for at least 48 hours. The invention applies in particular to the protection of said tire sidewalls against the visible effects of the migration of antioxidants and antiozonants present therein.

38 Claims, No Drawings

TIRE, THE SIDEWALLS OF WHICH CONTAIN A VARNISHED FILM

SPECIFICATION

The present application is a continuation of PCT/EP 00/06621, filed Jul. 12, 2000, now WO 01/04203.

BACKGROUND OF THE INVENTION

The present invention relates to a tire, the sidewalls of which comprise a vulcanized composition based on at least one elastomer. Also provided is a process for forming an even, varnished film on at least one of said sidewalls. In particular the invention protects the tire against the effects of the migration of antioxidants and antiozonants in the sidewalls that are visible on the respective outer faces of the sidewalls.

Certain rubber compositions are very susceptible to the action of ozone, in particular, vulcanized compositions based on diene elastomers. When an article comprising such a vulcanized elastomeric composition is subjected to prolonged static and dynamic stresses in the presence of ozone, visible cracks or fissures that are more or less marked appear on the surface of the article. These cracks are oriented substantially perpendicular to the direction of the stress. Their propagation under the action of persistent stress may eventually cause complete breakage of the article.

In order to minimize the effects of ozone, antiozonants intended to reduce the formation and propagation of cracks under the above mentioned stress, have been incorporated into such articles, especially tire sidewalls composed of such vulcanized elastomers. Waxes have also been used to provide a protective coating on the surface of the sidewalls so as to ensure additional protection under static stresses. The use of these antiozonants and waxes has proved effective in minimizing cracks on the surface of the sidewalls.

Unfortunately, the most effective known antiozonants also have a very great aptitude to migrate across the elastomer substrate of the sidewall and stain and color the surfaces adjacent to said substrate. More precisely, yellowish or brown marks are observed on the surfaces of sidewalls, a phenomenon known as "coloration".

Furthermore, waxes also migrate to the surface of sidewalls, the effect which makes the surface dull and gray, or even whitish, a phenomenon known as "efflorescence".

SUMMARY OF THE INVENTION

The subject of the present invention is a tire, the sidewalls of which comprise a vulcanized elastomer composition based on at least one elastomer, which makes it possible to overcome the disadvantages caused by the undesirable coloration and efflorescence phenomena.

Accordingly, the present invention provides a tire, the sidewalls of which contain a vulcanized elastomer composition, the composition comprising in combination:
  a polymer containing an oxy radical of the formula —O— therein, the polymer having an alkyl group on one side of the oxy radical and, on the other side of the oxy radical, at least one polyalkylene oxide block of the formula $(C_nH_{2n}O)_z$ joined to a hydrogen atom at the chain end thereof, such that the hydrogen atom and the end terminal oxygen of the polyalkylene oxide block form an alcohol function, in the amount of between 0.3 and 5 phr (parts by weight per 100 parts elastomer), and
  an alkali metal salt of an alkylsulphonic or alkylsulphuric acid, in an amount of between 0.5 and 10 phr.

The incorporation of the above polymer and alkali salt into the vulcanized elastomeric composition permits formation of an even, varnished film on the respective outer faces of the tire sidewalls comprising the vulcanized elastomer composition upon exposure to an atmosphere having an ozone content of at least 4 parts per hundred million, such as found in a moderately polluted urban atmosphere.

This even film has the advantage of giving said sidewalls a non-stained appearance, such that the aforementioned undesirable effects of said phenomena of coloration and efflorescence are thus completely overcome.

Furthermore, said film imparts a varnished appearance to said sidewalls, that is to say, one which shines like varnish, which significantly improves their aesthetic appearance.

DETAILED DESCRIPTION OF THE INVENTION

According to one embodiment of the invention, the polymer having an oxy radical comprises polyoxyethylene and polyoxypropylene blocks and, for example, corresponds to the formula:

$$R-O-(C_3H_6O)_x-(C_2H_4O)_y-H,$$

in which R is a blend of alkyl groups having from 13 to 15 carbon atoms, having a majority of 14 carbon atoms, and x varies from 3 to 15 and y varies from 3 to 5, the molecular weight of the polymer is from 500 g/mol to 1100 g/mol.

Advantageously, the polymer has a molecular weight which is about 670 g/mol (x being 5 and y being 4), or 510 g/mol (x and y each being 3), or 1050 g/mol (x being 15 and y being 4).

Preferably, the polymer having an oxy radical is present in the vulcanized elastomeric composition in an amount of about 2 phr.

According to a further embodiment of the invention, the alkali metal salt is a sodium salt of an alkylsulfonic or alkylsulfuric acid, present in said composition in an amount of about 5 phr, that corresponds to the formula:

$$R'-SO_z-Na,$$

in which R' is a blend of alkyl groups having from 3 to 17 carbon atoms, and z is an integer equal to 3 or 4.

Where the salt has the formula $R'-SO_3-Na$, R' has a majority of 8 or 15 carbon atoms.

Where the salt has the formula $R'-SO_4-Na$, R' has a majority of 8 or 13 carbon atoms.

According to a further aspect of the invention, the elastomeric composition comprises at least one antiozonant and/or at least one antioxidant. The antiozonant is selected from the group consisting of 2,4,6-tris(N-1,4-dimethylpentyl-p-phenylene-diamino)-1,3,5-triazine and N,N'-di(1,4-dimethylpentyl)-p-phenylenediamine. A suitable antioxidant is, for example, N-(1,3-dimethylbutyl)-N'-phenyl-p-phenylenediamine.

The invention also provides a process for forming an even, varnished film on the outer face of a sidewall of a tire comprising statically exposing a tire sidewall composed of a vulcanized elastomer composition of the invention, to ambient air having an ozone concentration equal to or greater than 20 parts per 100 million for at least 48 hours, in a chamber at a temperature substantially equal to or greater than 25° C., such that a film having a thickness of equal to or greater than 0.5 microns forms on the outer face of the sidewall. Preferably, the ambient air has an ozone content equal to or greater than 40 parts per 100 million.

This film also has the advantage of providing said sidewalls with a non-stained appearance, such that the aforementioned undesirable effects (coloration, efflorescence) are overcome, while providing a glossy appearance of the sidewall.

The aforementioned characteristics of the present invention, as well as others, will be better understood on reading the following description of several embodiments of the invention, which are given by way of illustration and not of limitation.

In the following examples, molecular weights were measured by the tonometry technique using a vapor pressure osmometer sold under the name "WESCAN model 232A". For these measurements, "RP" toluene was used as solvent and measurements were carried out at 50° C.

CONTROL EXAMPLE

The following mixture formulation was used for a vulcanized elastomer composition intended to form the sidewalls of a "control" tire (amounts given in parts by weight per 100 parts elastomer—phr):

| | |
|---|---|
| natural rubber: | 35 phr |
| polybutadiene: | 65 phr |
| carbon black N660: | 60 phr |
| aromatic oil: | 20 phr |
| "6PPD": | 3 phr |
| "Durazone 37": | 0.5 phr |
| sulphur: | 1.5 phr |
| "CBS": | 1 phr |
| zinc oxide: | 3 phr |
| stearic acid: | 1 phr, | where

"6PPD" is N-(1,3-dimethylbutyl)-N'-phenyl-p-phenylenediamine, which is both an antioxidant and an antiozonant, "Durazone 37" is the trade name of an antiozonant formed of a paraphenylenediamine-tri-substituted triazine antiozonant, i.e., 2,4,6-tris(N-1,4-dimethylpentyl-p-phenylene-diamino) 1,3,5-triazine, and "CBS" is N-cyclohexyl-benzothiazyl-sulphenamide, a vulcanization accelerator.

At the end of a certain time, yellow and brown stains and a generally matte appearance were noted on the outer face of the sidewall of the control tire made from the above composition, resulting from the migration of the antioxidants and antiozonants to the surface.

Examples 1 to 16 According to the Invention

Example 1

The following constituents were added to the elastomer composition of the control example, for mixing in the non-vulcanized state:

antistatic agent A: a sodium salt of an alkylsulphonic acid corresponding to the formula R'—$SO_3$—Na, in which R' is a blend of alkyl groups having 13 to 17 carbon atoms, respectively, and having a majority of 15 carbon atoms, sold by CLARIANT under the name HOSTASTAT HS 1, in an amount of 5 phr; and surfactant B: a polymer having the formula:

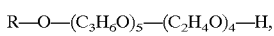

R—O—$(C_3H_6O)_5$—$(C_2H_4O)_4$—H, in which R is an alkyl having 13 to 15 carbon atoms, sold by ICI under the name SYNPERONIC LF/RA 280, in an amount of 2 phr.

More precisely, the polyoxyethylene block is linked to a hydrogen atom at the chain end thereof, such that the hydrogen forms an alcohol function with the terminal oxygen atom of the polyoxyethylene block.

The molecular weight of surfactant B, measured by the tonometry technique, is 670 g/mol.

Examples 2 to 7

In each of examples 2 to 7, the 0.5 phr of "Durazone 37" (used in the composition of the Control Example) has been replaced by 1 phr of another antiozonant, N,N'-di-(1,4-dimethylpentyl)-p-phenylenediamine, sold under the name "Santoflex 77." This new base formulation serves as a reference for Examples 2 to 7 below.

Example 2

The following were added to the new base formulation, for mixing in the non-vulcanized state:

the antistatic agent A "HOSTASTAT HS 1" of Example 1, in an amount of 5 phr, and the surfactant B "SYNPERONIC LF/RA 280" of Example 1, in an amount of 2 phr.

Example 3

The following were added to the new base formulation, for mixing in the non-vulcanized state:

the antistatic agent A "HOSTASTAT HS1" of Example 1, in an amount of 5 phr, and surfactant B: a polymer having the formula:

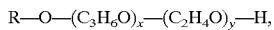

R—O—$(C_3H_6O)_x$—$(C_2H_4O)_y$—H, where R is an alkyl having 13 to 15 carbons and x and y are each 3, sold by ICI under the name SYNPERONIC LF/RA260, in an amount of 2 phr.

The molecular weight of this surfactant B, measured by the tonometry technique, is 510 g/mol.

Example 4

The following were added to the new base formulation, for the mixing in the non-vulcanized state:

the antistatic agent A "HOSTASTAT HSI" of Example 1, in an amount of 5 phr, and a surfactant B: a polymer having the formula:

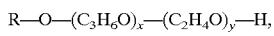

R—O—$(C_3H_6O)_x$—$(C_2H_4O)_y$—H, in which R is an alkyl of 13 to 15 carbons, x is 15 and y is 4, sold by ICI under the name SYNPERONIC LF/RA 310, in an amount of 2 phr.

The molecular weight of this new surfactant B, measured by the tonometry technique, is 1050 g/mol.

Example 5

The following were added to the new base formulation, for mixing in the non-vulcanized state:

an antistatic agent A: a sodium octanesulphonate, sold by STEPAN under the name "BIO-TERGE PAS-8 S," which has been dried beforehand, in an amount of 5 phr, and the surfactant B "SYNPERONIC LF/RA 280" of Example 1, in an amount of 2 phr.

Example 6

The following were added to the new base formulation, for mixing in the non-vulcanized state:

an antistatic agent A: a sodium octylsulphonate, sold by RHODIA under the name "RHODAPON OLS," which was dried beforehand, in an amount of 5 phr, and the surfactant B "SYNPERONIC LF/RA 280" of Example 1, in an amount of 2 phr.

Example 7

The following were added to the new base formulation, for mixing in the non-vulcanized state:

an antistatic agent A: a sodium tridecylsulphate, sold by RHODIA under the name "RHODAPON TDS," which was dried beforehand, in an amount of 5 phr, and the surfactant B "SYNPERONIC LF/RA 280" of Example 1, in an amount of 2 phr.

Examples 8 to 16

For examples 8 to 16, the following were added to the elastomer composition corresponding to the formulation in said Control Example, with the exception that different amounts of "6PPD" and "Durazone 37" were used (specified below), for mixing in the non-vulcanized state:

the antistatic agent A sold under the name "HOSTASTAT HS 1", in an amount of between 0.5 and 10 phr, and the surfactant B sold under the name "SYNPERONIC LF/RA 280", in an amount of between 0.3 and 5 phr, The table below sets forth the amounts of antistatic agent A, surfactant B, "6PPD" and "Durazone 37" used for each of Examples 8 to 16.

|  | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|
| Antistatic agent A | 1 | 3 | 7 | 9 | 5 | 5 | 5 | 5 | 5 |
| Surfactant B | 2 | 2 | 2 | 2 | 0.5 | 1 | 3 | 4 | 2 |
| "6PPD" | 3 | 3 | 3 | 3 | 3 | 3 | 3 | 3 | 0 |
| "Durazone 37" | 1 | 1 | 1 | 1 | 1 | 1 | 1 | 1 | 1 |

Placement of Tires Whose Sidewalls Comprise a Vulcanized Elastomer Composition According to Invention Examples 1 to 16 in an Ozone—Containing Atmosphere 1) In a first embodiment, tires having sidewalls comprising the vulcanized elastomer compositions of Examples 1 to 16 were placed in static conditions in an outdoor urban-type atmosphere, at 20° C. and sheltered from the sun and rain. This atmosphere contains a concentration of ozone of 4 parts per 100 million. The tire placement ensured that each sidewall was exposed to this open atmosphere for a period of 2 months.

Surprisingly, at the end of this period, the presence of an even, varnished film, i.e., one that shined or gleamed like varnish, was noted on the outer face of each sidewall. More precisely, this film had an average thickness of about 0.8 μm. No staining, soiling or dull area was visible on the sidewalls, unlike the control tire containing the composition of the Control Example.

2) In a second embodiment, tires whose sidewalls contained a vulcanized elastomer composition in accordance with Examples 1 to 16 were placed in static conditions in an outdoor urban type atmosphere at 25° C. and sheltered from the sun and rain. This atmosphere also contained an ozone concentration of 4 parts per 100 million. The tire placement ensured that each sidewall was exposed to this open atmosphere for a period of 5 months.

At the end of this period, the presence of a varnished film having an average thickness of about 0.8 μm was noted, and the sidewalls were completely devoid of stains and had a glossy appearance.

3) In a third embodiment, tires whose sidewalls contained a vulcanized elastomer composition in accordance with Examples 1 to 16 were placed in static conditions in an ozonation enclosure, i.e., a closed chamber in which the concentration of ozone in the air was about 40 parts per 100 million and the internal temperature was 25° C. The tire placement exposed each sidewall to this closed atmosphere for a period of 7 days.

At the end of the period, the presence of an even, varnished film having an average thickness of about 1 μm was noted, and the sidewalls were completely devoid of stains and had a glossy appearance.

4) In a fourth embodiment, tires whose sidewalls contained a vulcanized elastomer composition in accordance with Examples 1 to 16 were placed in static conditions in an ozonation enclosure, i.e. a closed chamber in which the concentration of ozone in the air was about 50 parts per 100 million and the internal temperature was 38° C. The tire placement exposed each sidewall to this closed atmosphere for a period of 24 or 72 hours.

At the end of the period, the presence of an even, varnished film having an average thickness of about 1 μm was noted, and the sidewalls were completely devoid of stains and had a glossy appearance.

5) In a fifth embodiment, tires whose sidewalls contained a vulcanized elastomer composition in accordance with Examples 1 to 16 were placed in static conditions in an ozonation enclosure, i.e. a closed chamber having an ozone concentration in air of about 200 parts per 100 million and internal temperature of 25° C. The tire placement exposed each sidewall to this closed atmosphere for a period of 48 hours.

At the end of the period, the presence of an even, varnished film having an average thickness of 1.5 μm was noted, and the sidewalls were completely devoid of stains and had a glossy appearance.

6) In a variant of embodiments 3) to 5), the tires which had undergone the ozonation treatment in an enclosed atmosphere were placed in the open air and in static conditions, under the conditions specified for embodiments 1) and 2).

The same results were obtained for sidewalls covered with a varnished film having an average thickness of about 1.5 μm.

For each tire having being placed in accordance with one or another of the above 6 embodiments, the following qualitative tests were performed to evaluate performance.

"coloration/efflorescence": test of the ability of the varnished film that formed to withstand the effects of the coloration and efflorescence phenomena, which are due to the surface migration of antiozonants;

"dynamic strength": test of the mechanical strength of said films under dynamic stress, consisting in covering 12,000 kilometers on a roller with an imposed deflection of 35% at 60 kilometers per hour; this test imposes a dynamic deformation at the surface of the sidewalls of the order of 15% extension;

"curb scraping": rubbing of the sidewalls having said films against a curb for several meters to determine any detachment or disappearance of the film;

"water": test of the resistance of said films when immersed in water for 4 hours; this simulates, for example, long-duration parking of a vehicle in a puddle of water in a parking lot;

"washing": test of the resistance of said films to washing by rubbing with an aqueous soap containing solution.

The results obtained are set forth in the table below.

| | |
|---|---|
| coloration/efflorescence | none; even, varnished appearance |
| dynamic strength | even, varnished film maintained |
| kerb scraping | film disappeared |
| water | gradual degradation of the film |
| washing | film disappeared |

It will be noted that the films immersed in water disappear only very gradually over time.

Furthermore, "test pieces" comprising vulcanized elastomer compositions in accordance with Examples 1 to 16 according to the invention were subjected to ozonization in accordance with embodiment 4) above, i.e., in a chamber having an atmosphere containing 50 parts per 100 million of ozone, at 38° C., for 24 hours and with static surface deformation under extension of 18%.

The degree of gloss of "test pieces" 1 to 16 was measured, so as to provide objective characterization of the varnished nature of the films thus obtained.

To this end, plates of rubber vulcanized by means of a so-called "Teflon-coated" mold and then treated with ozone as indicated were used for these "test pieces", each one being formed by a stack of two half-plates. Each half-plate has a height of 1.5 mm, a length of 15 cm and a width of 14 cm.

Each upper plate is formed from a vulcanized elastomer composition in accordance with Examples 1 to 16. Each lower plate was formed from the vulcanized elastomer composition of the Control Example.

The vulcanization in a "Teflon-coated" mold was carried out in order to obtain for each half-plate a given surface state which characterizes both the control composition and the composition (1–16) according to the invention and which, consequently, determines said desired gloss measurements.

The "Teflon-coated" mold is defined first by the steel forming it, which is of the Z3 CN 18-10 type (AFNOR nomenclature) and second by the treatment using jets of projectiles, followed by "Teflon-coating," to which it is subjected.

This treatment using jets of projectiles is intended to provide a given roughness value Ra (arithmetic mean deviation of the profile) which is between 2 and 4 $\mu$m.

The roughness measurements used a surface-roughness tester sold under the name "MITUTOYO, SURTRONIC series".

More precisely, the length Lm of evaluation of the roughness on the plates is selected to be 4 mm, and the elementary length (threshold Le of measurement by the sensor of the surface-roughness tester, or cut-off) is selected to be 0.8 mm. Furthermore, the filter used for this elementary length is of the "pc50" type, with a side f=5 $\mu$m.

The sensor is a diamond-type sensor, and its speed of displacement is 0.25 mm/s.

The treatment with jets of projectiles is carried out at a pressure of 3 bar, at a jet distance of 10 cm and with a normal incidence. The projectiles comprise particles of white corundum (alumina), which have an average size of 80 $\mu$m and a standardized size of 150 mesh (in accordance with Standard NF XII-508).

The later "Teflon-coating" treatment comprises:

spraying polytetrafluoroethylene onto the inner surface of the mold wall, so as to obtain a thickness of sprayed material of 10 to 15 $\mu$m on said surface, followed by drying at 250° C. for 5 minutes, then cooling; and again spraying polytetrafluoroethylene onto said inner surface, to obtain a thickness of sprayed material of 5 to 10 $\mu$m on said surface, followed by drying at 110° C. for 5 minutes, by curing at 390° C. for 45 minutes, and by cooling.

A roughness value Ra of between 0.5 and 1.2 $\mu$m is obtained for the inner face of the mold wall, this range thus determining a given surface state for the two half-plates which have been vulcanized and treated with ozone, for the gloss measurements.

The gloss measurements are performed using a reflectometer sold under the name "TRI-gloss BYK Gardner". This apparatus conforms to standard ASTM D523 or ISO 2813.

For all the "test pieces" 1 to 16, the presence of an even, varnished film rendering them completely devoid of stains and imparting thereto a glossy appearance was noted.

The following table shows, for three different angles of incidence, results of the degree of gloss obtained for each vulcanized composition in accordance with Examples 1 to 16 and treated with ozone, compared to a control of vulcanized composition "T", which differs from that of the Control Example in that it does not comprise any "Durazone 37". Vulcanized composition "T" was subjected to ozonization in an enclosure under conditions identical to those of Examples 1 to 16, i.e. as in embodiment 4) above.

| | T | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|---|---|---|---|---|---|---|
| degree of gloss, incidence 20° | 0.5 | 7.2 | 3.7 | 2.2 | 1.4 | 5.2 | 10.0 | 11.0 | 6.3 | 6.6 | 3.8 | 3.4 | 4.9 | 4.5 | 4.6 | 6.9 | 3.4 |
| degree of gloss, incidence 60° | 6.5 | 38.7 | 24.2 | 16.9 | 11.6 | 32.0 | 47.0 | 45.0 | 35.7 | 37.5 | 27.0 | 25.8 | 32.9 | 30.3 | 31.8 | 37.1 | 24.1 |

-continued

|  | T | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|---|---|---|---|---|---|---|
| degree of gloss, incidence 85° | 22.4 | 39.4 | 24.7 | 20.0 | 13.0 | 26.0 | 43.0 | 25.0 | 34.6 | 36.7 | 27.7 | 28.3 | 37.3 | 33.5 | 34.3 | 38.9 | 25.0 |

This table shows that the film formed from a composition according to the invention which has been subjected to ozonization is of varnished nature, i.e., it is characterized by high specular reflection which imparts thereto a degree of gloss of greater or lesser intensity. On the other hand, the control composition "T", is characterized by diffuse reflection which imparts conventional matteness thereto.

By way of comparison of the varnished appearance of the film obtained with the elastomer composition according to the invention with conventional films for making sidewalls shine that are formed from a varnish i.e. a solution that is applied to said sidewalls, reference may be made to the varnish sold by Rhone-Poulenc under the name "LYNDCOAT BR 790". This varnish has a degree of gloss of the same order of magnitude as the varnished film formed from the composition according to the invention, under analogous measurement conditions starting from a surface state close to that selected for the gloss measurements referred to above.

It will be noted that the varnished films that form on tire sidewalls composed of compositions according to the invention are such that they clearly show the different markings usually applied to sidewalls, during the building thereof and during later testing. Advantageously, it is noted that, owing to the presence of this film, the sidewall markings are visible with a contrast which is superior compared with the rest of the outer face of said sidewalls.

It will also be noted that the varnished films that form on tires composed of compositions according to the invention remain practically intact after being used in travel.

We claim:

1. A tire, the sidewalls of which comprise a vulcanized elastomer composition based on at least one elastomer, the composition comprising in combination:

a polymer containing an oxy radical of the formula —O— therein, the polymer having an alkyl group on one side of the oxy radical and, on the other side of the oxy radical, at least one polyalkylene oxide block of the formula $(C_nH_{2n}O)_z$ joined to a hydrogen atom at the chain end thereof, such that the hydrogen atom and the end terminal oxygen of the polyalkylene oxide block form an alcohol function, in the amount of between 0.3 and 5 phr (parts by weight per 100 parts elastomer), wherein z varies from 3 to 15 and an alkali metal salt of an alkylsulphonic or alkylsulphuric acid, in an amount of between 0.5 and 10 phr.

2. The tire according to claim 1, wherein the polymer comprises polyoxyethylene and polyoxypropylene blocks.

3. The tire according to claim 2, wherein the polymer has an average molecular weight of about 500 g/mol to 1100 g/mol and corresponds to the formula:

R—O—(C$_3$H$_6$O)$_x$—(C$_2$H$_4$O)$_y$—H, wherein R is an alkyl group having from 13 to 15 carbon atoms, wherein x varies from 3 to 15 and y varies from 3 to 5.

4. The tire according to claim 3, wherein the polymer has a number average molecular weight of about 670 g/mol.

5. The tire according to claim 4, wherein x is 5 and y is 4.

6. The tire according to claim 3, wherein the polymer has a number average molecular weight of about 510 g/mol.

7. The tire according to claim 6, wherein x and y are each 3.

8. The tire according to claim 3, wherein the polymer has a number average molecular weight of about 1050 g/mol.

9. The tire according to claim 8, wherein x is 15 and y is 4.

10. The tire according to claim 1, wherein the composition comprises the polymer in an amount of 2 phr.

11. The tire according to claim 1, wherein the alkali metal salt is a sodium salt corresponding to the formula:

R'—SO$_{z'}$—Na, wherein R' is an alkyl group having from 3 to 17 carbon atoms, and z' is an integer equal to 3 or 4.

12. The tire according to claim 11, wherein the salt corresponds to the formula:

R'—SO$_3$—Na.

13. The tire according to claim 12, wherein R' has 8 carbon atoms.

14. The tire according to claim 12, wherein R' has 15 carbon atoms.

15. The tire according to claim 11, wherein the salt corresponds to the formula:

R'—SO$_4$—Na.

16. The tire according to claim 15, wherein R' has 8 carbon atoms.

17. The tire according to claim 15, wherein R' has 13 carbon atoms.

18. The tire according to claim 1, wherein the composition comprises the salt in an amount of 5 phr.

19. The tire according to claim 1, wherein the elastomeric composition further comprises an antiozonant and/or an antioxidant.

20. The tire according to claim 19, wherein the antiozonant is selected from the group consisting of 2,4,6-tris(N-1,4-dimethylpentyl-p-phenylenediamino)-1,3,5-triazine and N,N'-di(1,4-dimethylpentyl)-p-phenylenediamine.

21. The tire according to claim 19, wherein the antioxidant is N-(1,3-dimethylbutyl)-N'-phenyl-p-phenylenediamine.

22. A tire, the sidewalls of which comprise a vulcanized rubber composition based on at least one elastomer, the composition comprising in combination:

a polymer having a number average molecular weight of 500 g/mol to 1100 g/mol corresponding to the formula:

R—O—(C$_3$H$_6$O)$_x$(C$_2$H$_4$O)$_y$, wherein R is an alkyl group having from 13 to 15 carbon atoms, x varies from 3 to 15 and y varies from 3 to 5, in an amount of between 0.3 and 5 phr (parts by weight per 100 parts elastomer), and a sodium salt of an alkylsulfonic or alkylsulfuric acid corresponding to the formula:

$$R'-SO_z-Na,$$

wherein R' is an alkyl group having from 3 to 17 carbon atoms and z is an integer equal to 3 or 4, in an amount of between 0.5 and 10 phr.

23. The tire according to claim 22, wherein the polymer has a number average molecular weight of about 670 g/mol, wherein x is 5 and y is 3.

24. The tire according to claim 22, wherein the polymer has a number average molecular weight of about 510 g/mol, wherein x and y are each 3.

25. The tire according to claim 22, wherein the polymer has a number average molecular weight of about 1050 g/mol, wherein x is 15 and y is 4.

26. The tire according to claim 23, wherein the salt corresponds to the formula:

$$R'-SO_3-Na,$$

wherein R' has 8 carbon atoms.

27. The tire according to claim 22, wherein the salt corresponds to the formula:

$$R'-SO_3-Na,$$

wherein R' has 15 carbon atoms.

28. The tire according to claim 22, wherein the salt corresponds to the formula:

$$R'-SO_4-Na,$$

wherein R' has 8 carbon atoms.

29. The tire according to claim 22, wherein the salt corresponds to the formula:

$$R'-SO_3-Na,$$

wherein R' has 13 carbon atoms.

30. The tire according to claim 22, wherein the elastomeric composition further comprises an antiozonant selected from the group consisting of 2,4,6 tris (N-1,4 dimethylpentyl-p-phenyleneamino)-1,3,5 triazine and N,N'-di (1,4 dimethylpentyl)-p-phenylenediamine and/or an antioxidant being N-(1,3-dimethyl butyl)-N'-phenyl-p-phenylenediamine.

31. The tire accorrding to claim 22, wherein the composition comprises the polymer in an amount of 2 phr.

32. The tire according to claim 22, wherein the composition comprises the salt in a amount of 5 phr.

33. A tire, the sidewalls of which comprise a vulcanized rubber composition based on at least one elastomer, the composition comprising in combination:

a polymer having a number average molecular weight of 500 g/mol to 1100 g/mol corresponding to the formula:

$$R-O-(C_3H_6O)_x(C_2H_4O)_y,$$

wherein R is an alkyl group having from 13 to 15 carbon atoms, wherein x varies from 3 to 15 and y varies from 3 to 5, in an amount of between 0.3 and 5 phr (parts by weight per 100 parts elastomer), and a salt corresponding to the formula:

$$R'SO_3-Na,$$

wherein R' is an alkyl having 8 or 15 carbon atoms, or a salt corresponding to the formula:

$$R'SO_4-Na,$$

in which R' is an alkyl having 8 or 13 carbon atoms, in an amount of between 0.5 and 10 phr.

34. The tire according to claim 33, wherein the salt is present in an amount of 2 phr.

35. The tire according to claim 33, wherein the polymer is present in amount of 2 phr.

36. The tire according to claim 33, wherein the composition further comprises an antiozonant selected from the group consisting of 2,4,6 tris (N-1,4 dimethylpentyl-p-phenyleneamino)-1,3,5 triazine and N,N'-di (1,4 dimethylpentyl)-p-phenylenediamine and/or an antioxidant being N-(1,3-dimethyl butyl)-N'-phenyl-p-phenylenediamine.

37. A process for forming an even varnished film on the outer face of a sidewall of a tire, said sidewall comprising a vulcanized elastomer composition based on at least one elastomer, said composition comprising:

a polymer containing an oxy radical of the formula —O— therein, the polymer having an alkyl group on one side of the oxy radical and, on the other side of the oxy radical, at least one polyalkylene oxide block of the formula $(C_nH_{2n}O)_z$ joined to a hydrogen atom at the chain end thereof, such that the hydrogen atom and the end terminal oxygen of the polyalkylene oxide block form an alcohol function, in the amount of between 0.3 and 5 phr (parts by weight per 100 parts elastomer), wherein z varies from 3 to 15 and an alkali metal salt of an alkylsulphonic or alkylsulphuric acid, in an amount of between 0.5 and 10 phr said process comprising statically exposing said tire sidewall to ambient air having an ozone concentration equal to or greater than 20 parts per 100 million for at least 48 hours in a chamber at a temperature equal to or greater than 25° C., such that a film having a thickness of equal to or greater than 0.5 microns forms on the outer face of the sidewall.

38. The process according to claim 37, wherein the ozone concentration is equal to or greater than 40 parts per 100 million.

* * * * *

UNITED STATES PATENT AND TRADEMARK OFFICE
CERTIFICATE OF CORRECTION

PATENT NO. : 6,554,037 B2
DATED : April 29, 2003
INVENTOR(S) : Bataille et al.

It is certified that error appears in the above-identified patent and that said Letters Patent is hereby corrected as shown below:

Column 9,
Line 55, "alkylsuiphuric" should read -- alkylsulphuric --

Column 10,
Line 28, "R´—$SO_z$—Na," should read -- R´—$SO_{z'}$—Na, --

Column 11,
Line 22, "claim 23," should read -- claim 22, --

Signed and Sealed this

Twenty-third Day of September, 2003

JAMES E. ROGAN
*Director of the United States Patent and Trademark Office*